US011133593B2

(12) United States Patent
Batel et al.

(10) Patent No.: US 11,133,593 B2
(45) Date of Patent: Sep. 28, 2021

(54) COMPACT ANTENNA DEVICE

(71) Applicant: Commissariat A L'Energie Atomique et aux Energies Alternatives, Paris (FR)

(72) Inventors: Lotfi Batel, Grenoble (FR); Antonio Clemente, Grenoble (FR); Christophe Delaveaud, Grenoble (FR)

(73) Assignee: Commissariat A L'Energie Atomique et aux Energies Alternatives, Paris (FR)

(*) Notice: Subject to any disclaimer, the term of this patent is extended or adjusted under 35 U.S.C. 154(b) by 0 days.

(21) Appl. No.: 16/556,638

(22) Filed: Aug. 30, 2019

(65) Prior Publication Data

US 2020/0076084 A1 Mar. 5, 2020

(30) Foreign Application Priority Data

Aug. 31, 2018 (FR) ..................... 18 57848

(51) Int. Cl.
| | | |
|---|---|---|
| *H01Q 9/28* | (2006.01) | |
| *H01Q 1/48* | (2006.01) | |
| *H01Q 3/26* | (2006.01) | |
| *H01Q 5/48* | (2015.01) | |
| *G06K 19/077* | (2006.01) | |

(52) U.S. Cl.
CPC ............. *H01Q 9/285* (2013.01); *H01Q 1/48* (2013.01); *H01Q 3/2605* (2013.01); *G06K 19/07786* (2013.01); *H01Q 5/48* (2015.01)

(58) Field of Classification Search
CPC ............ H01Q 9/285; H01Q 9/18; H01Q 9/28; H01Q 1/48; H01Q 3/2605; H01Q 5/48; H01Q 19/108; H01Q 25/005; H06K 19/07786
See application file for complete search history.

(56) References Cited

U.S. PATENT DOCUMENTS

| | | | |
|---|---|---|---|
| 10,547,115 B2* | 1/2020 | Jouanlanne | .......... H01Q 13/103 |
| 2002/0171599 A1 | 11/2002 | Palmer et al. | |
| 2004/0027304 A1* | 2/2004 | Chiang | ............... H01Q 21/205 |
| | | | 343/810 |
| 2005/0040994 A1 | 2/2005 | Mazoki et al. | |
| 2005/0212714 A1 | 9/2005 | Chiang et al. | |
| 2007/0152903 A1 | 7/2007 | Lin et al. | |
| 2010/0141530 A1* | 6/2010 | McMahon | ............... H01Q 5/40 |
| | | | 342/417 |
| 2014/0313080 A1 | 10/2014 | Smith et al. | |
| 2019/0140364 A1* | 5/2019 | Mirmozafari | .......... H01Q 21/24 |

FOREIGN PATENT DOCUMENTS

| | | | | |
|---|---|---|---|---|
| WO | WO 2015/147906 A1 | | 10/2015 | |
| WO | WO-2016097362 A1 * | | 6/2016 | ........... H01Q 9/0421 |

OTHER PUBLICATIONS

French Preliminary Search Report dated Jul. 1, 2019 in French Application 18 57848, filed on Aug. 31, 2018 (with English Translation of Categories of Cited Documents & Written Opinion).

* cited by examiner

*Primary Examiner* — Raymond R Chai
(74) *Attorney, Agent, or Firm* — Oblon, McClelland, Maier & Neustadt, L.L.P.

(57) ABSTRACT

A compact antenna device has a ground plane at floating potential and at least one dipole antenna extending through the ground plane. The at least one dipole antenna has first and second strands extending on either side of the ground plane. A control circuit is arranged on the ground plane in order to control the at least one dipole antenna.

18 Claims, 3 Drawing Sheets

COMPACT ANTENNA DEVICE

TECHNICAL FIELD

The invention relates to the technical field of compact antenna devices. The antenna device may form a directional antenna with beam offsetting, or else form a reconfigurable antenna.

Definitions

"Compact" is understood to mean that the maximum characteristic dimension of the antenna device is less than or equal to $\lambda/2$, where $\lambda$ is the operating wavelength of the device.

"Directional" is understood to mean the capability of an antenna to concentrate the radiated energy within a solid angle or in a specific direction. This capability, expressed in dBi (decibels relative to isotropic), is defined as being the maximum value of the ratio between the power radiated per solid angle unit and the average radiated power over all directions in space.

"Super-directional" is understood to mean that the antenna has a directivity that exceeds a reference limit, such as the maximum theoretical Harrington limit.

"Beam offsetting" is understood to mean that the radiation pattern of the antenna (also called beam) is able to be directed in any pointing direction with angular scanning, for example over 360° in an azimuthal plane. The azimuth is the angle in the horizontal plane between the direction of the beam and a reference direction.

"Reconfigurable" is understood to mean that at least one feature of the antenna is able to be modified during its lifetime, after it is manufactured. The feature or features generally able to be modified are the frequency response (in terms of amplitude and in terms of phase), the radiation pattern, and the polarization of the electromagnetic field.

The invention is applied notably in the Internet of Things (IoT in acronym form), the spatialization of wireless communications, radiofrequency identification (RFID) readers, electromagnetic compatibility (EMC) devices, radars, etc.

PRIOR ART

An antenna device known from the prior art, notably from the document H. Kawakami et al., *"Electrically steerable passive array radiator (ESPAR) antennas"*, IEEE Antennas and Propagation Magazine, vol. 47, no. 2, 43-50, 2005, (hereinafter D1) has:
- a ground plane to which an electrical reference potential is applied;
- a set of monopole antennas, extending over the ground plane, and comprising:
  - a central monopole, situated in the centre of the ground plane,
  - three pairs of peripheral monopoles, arranged around the central monopole with central symmetry;
- a skirt, extending under the ground plane (i.e. opposite the monopoles);
- a coaxial cable, arranged through the ground plane and the skirt in order to supply power to the central monopole.

Such a device from the prior art is compact. Specifically, the monopoles have a height of $\lambda/4$ and the ground plane, which is circular, has a diameter of $\lambda/2$. The spatial finiteness of the ground plane (i.e. of finite dimension) exhibits a drawback with regard to the radiation pattern of the antenna. Specifically, the ground plane generates an offset of the radiation pattern of the antenna of a certain elevation angle (83° mentioned in D1). Therefore, the gain of the antenna is not maximum in the azimuthal plane. It is for this reason that D1 introduced a skirt, having a height of $\lambda/4$, in the extension of the ground plane in order to reduce the elevation angle (by 20°) and thereby to increase the gain (by 1.6 dB) in the azimuthal plane.

However, such a device from the prior art is not completely satisfactory in that introducing the skirt considerably increased the size of the antenna (by a factor of 2 for the thickness).

SUMMARY OF THE INVENTION

The invention aims to fully or partly rectify the above-mentioned drawbacks. To this end, one subject of the invention is an antenna device, having:
- a ground plane at floating potential;
- at least one dipole antenna, extending through the ground plane, and comprising first and second strands extending on either side of the ground plane;
- a control circuit, arranged on the ground plane in order to control the or each dipole antenna.

Such a device according to the invention is thus able to remain compact while at the same time keeping maximum gain in the azimuthal plane (i.e. the plane defined by the ground plane), and to do so by virtue of the first and second strands of the or each dipole antenna, which extend on either side of the ground plane. Specifically, such a geometrical configuration of the strands makes it possible to limit the disturbance of the radiation pattern of the corresponding dipole antenna by the ground plane, and to do so in spite of the spatial finiteness of the ground plane.

Furthermore, arranging the control circuit on the ground plane makes it possible to limit the disturbance of the radiation pattern by the components of the circuit (and the metallizations—tracks and connection lands), and thus to allow super-directivity of the device according to the invention in the presence of a network of dipole antennas.

Definitions

"Floating potential" is understood to mean that the ground plane is not subjected to an electrical reference potential at the operating frequency or frequencies of the device.

"Through" is understood to mean that the or each dipole antenna passes through the ground plane from one side to the other.

The device according to the invention may have one or more of the following features.

According to one feature of the invention, the first and second strands of the or each dipole antenna extend along the normal to the ground plane.

One advantage that is provided is thus that of overcoming the disturbance of the radiation pattern of the or each dipole antenna by the ground plane.

According to one feature of the invention, the first and second strands of the or each dipole antenna extend on either side of the ground plane with planar symmetry.

"Planar symmetry" is understood to mean that the ground plane forms a plane of symmetry for the first and second strands of the or each dipole antenna.

One advantage that is provided is thus that of reducing cross polarization.

According to one feature of the invention, the first and second strands of the or each dipole antenna respectively have first and second distal ends respectively provided with first and second capacitive roofs, the first and second capacitive roofs being short-circuited.

"Distal end" is understood to mean the end furthest from the ground plane.

One advantage that is provided by such capacitive roofs is thus the possibility of reducing the size of the first and second strands of the or each dipole antenna.

According to one feature of the invention, the first and second capacitive roofs are provided with slots.

One advantage that is provided by the presence of slots is thus the possibility of reducing the size of the capacitive roofs.

According to one feature of the invention, the first and second strands of the or each dipole antenna are printed on a printed circuit board.

One advantage that is provided is thus ease of manufacture and low cost.

According to one feature of the invention, the device has short-circuit strands arranged so as to short-circuit the first and second capacitive roofs; and the short-circuit strands are printed on the printed circuit board.

One advantage that is provided is thus ease of manufacture and low cost.

According to one feature of the invention, the device has a set of dipole antennas extending through the ground plane, each dipole antenna of the set comprising first and second strands extending on either side of the ground plane.

One advantage that is provided is thus that of being able to form a super-directional network of dipole antennas the beam direction of which is able to vary in the azimuthal plane.

According to one feature of the invention, the device has:
- a first dipole antenna;
- a second dipole antenna, having electromagnetic coupling to the first dipole antenna.

The second dipole antenna forms a stray antenna that makes it possible, by virtue of the electromagnetic coupling to the first dipole antenna and of the introduction of matched load impedances within the control circuit, to achieve a reconfigurable antenna.

According to one feature of the invention, the set of dipole antennas has:
- a central dipole antenna, arranged in the centre of the ground plane;
- at least one pair of peripheral dipole antennas, arranged around the central dipole antenna with central symmetry.

One advantage that is provided by the pair or pairs of peripheral dipole antennas is thus that of defining an aperture angle for the beam. The pair or pairs of peripheral dipole antennas will be distributed over the ground plane, around the central dipole antenna, in the preferred directions depending on the targeted application. Each pair of peripheral dipole antennas, arranged around the central dipole antenna with central symmetry, defines a direction with two possible orientations for the radiation of the antenna. The pair or pairs of peripheral dipole antennas form stray antennas that make it possible, by virtue of the electromagnetic coupling to the central dipole antenna and of the introduction of matched load impedances within the control circuit, to achieve a super-directional antenna.

According to one feature of the invention, the set of dipole antennas has four pairs of peripheral dipole antennas, arranged around the central dipole antenna with central symmetry.

One advantage that is provided is thus that of achieving an aperture angle of 45° for the beam if the four pairs of peripheral dipole antennas are distributed uniformly around the central dipole antenna, and with matched load impedances within the control circuit.

According to one feature of the invention, the dipole antennas of the set are spaced from one another by a distance less than or equal to $\lambda/2$, preferably less than or equal to $\lambda/5$, where $\lambda$ is the operating wavelength of the device.

According to one feature of the invention, the device has a single dipole antenna, and the control circuit has matched load impedances in order to form a reconfigurable antenna.

According to one feature of the invention, the device has a maximum characteristic dimension less than or equal to $\lambda/2$, where $\lambda$ is the operating wavelength of the device.

The invention also relates to an object having a device according to the invention.

By way of nonlimiting example, the object may be selected from the group containing an object connected to the Internet, a radiofrequency identification reader, a radar, a sensor or an electromagnetic compatibility device.

BRIEF DESCRIPTION OF THE DRAWINGS

Other features and advantages will become apparent in the detailed description of various embodiments of the invention, the description being accompanied by examples and references to the appended drawings.

FIG. 5 is accompanied by an insert showing the central part of the dipole antenna on an enlarged scale.

Figure 1:
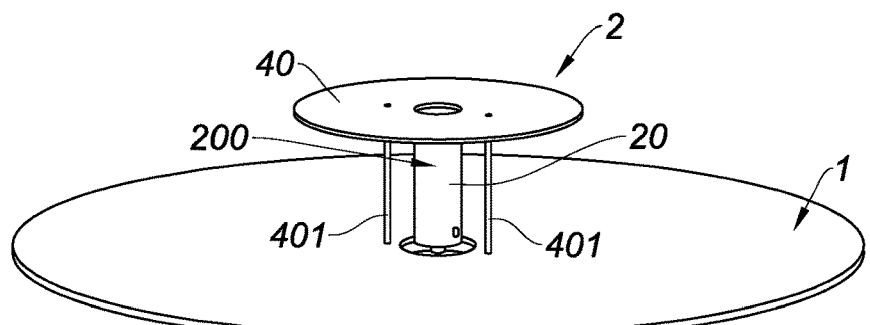
FIG. 1 is a schematic perspective view of a device according to the invention, illustrating an embodiment with a single dipole antenna.
Figure 2:
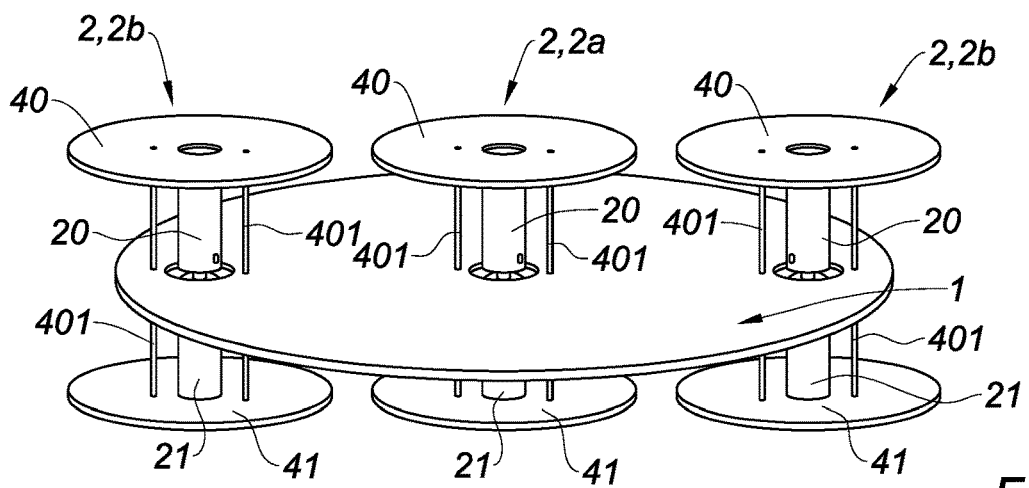
FIG. 2 is a schematic perspective view of a device according to the invention, illustrating an embodiment with a central dipole antenna and two peripheral dipole antennas.

It should be noted that, for the sake of readability and ease of understanding, the drawings described above are schematic. The strands 20, 21 of the dipole antenna that are illustrated in FIGS. 1 and 2 are thus not short-circuited, unlike their illustrations may suggest.

DETAILED DISCLOSURE OF THE EMBODIMENTS

Elements that are identical or provide the same function will carry the same references for the various embodiments, for the sake of simplicity.

One subject of the invention is an antenna device, having:
a ground plane 1 at floating potential;

at least one dipole antenna 2, extending through the ground plane 1, and comprising first and second strands 20, 21 extending on either side of the ground plane 1;

a control circuit 3, arranged on the ground plane 1 in order to control the or each dipole antenna 2.

Ground Plane

The ground plane 1 may be formed from a metal material, such as copper. The ground plane 1 may be circular in shape, for example with a diameter $\lambda/2$, where $\lambda$ is the operating wavelength of the antenna. However, the diameter of the ground plane 1 may be less than $\lambda/2$. By way of nonlimiting example, in the case of an RFID spatial filtering application in the UHF band (around 868 MHz), the diameter of the ground plane 1 is 18 cm.

However, other shapes may be contemplated for the ground plane 1, such as a rectangular or square shape.

The ground plane 1 is at floating potential, that is to say that the ground plane 1 is not subjected to an electrical reference potential at the operating frequencies of the device, for example in the radiofrequency range (between 3 kHz and 300 GHz). The ground plane 1 is thus not "seen" by the device at the operating frequency or frequencies.

Apertures are formed in the ground plane 1, such that the or each dipole antenna 2 is able to extend through the ground plane 1. The or each dipole antenna 2 is arranged such that the first and second strands 20, 21 are situated at a distance from the ground plane 1, so as to avoid any contact with the ground plane 1.

However, the first and second strands 20, 21 may be in contact with the ground plane 1 when the first and second strands 20, 21 extend on either side of the ground plane with planar symmetry. By way of nonlimiting example, the or each dipole antenna 2 may be joined to the ground plane 1 by way of a spacer (not illustrated in the figures) that is not electrically conductive.

It is possible to equip the ground plane 1 with components, for example a DC current circuit, a radiofrequency (RF) circuit, or else a power supply cell, and to do so without altering the operation of the device.

Structure of a Dipole Antenna

The first and second strands 20, 21 of the or each dipole antenna 2 advantageously extend along the normal to the ground plane 1. The first and second strands 20, 21 of the or each dipole antenna 2 advantageously extend on either side of the ground plane 1 with planar symmetry.

All of the first and second strands 20, 21 of the or each dipole antenna 2 have for example a height of the order of $\lambda/5$. By way of nonlimiting example, in the case of an RFID spatial filtering application in the UHF band (around 868 MHz), the height of all of the first and second strands 20, 21 is 7 cm.

Figure 3:
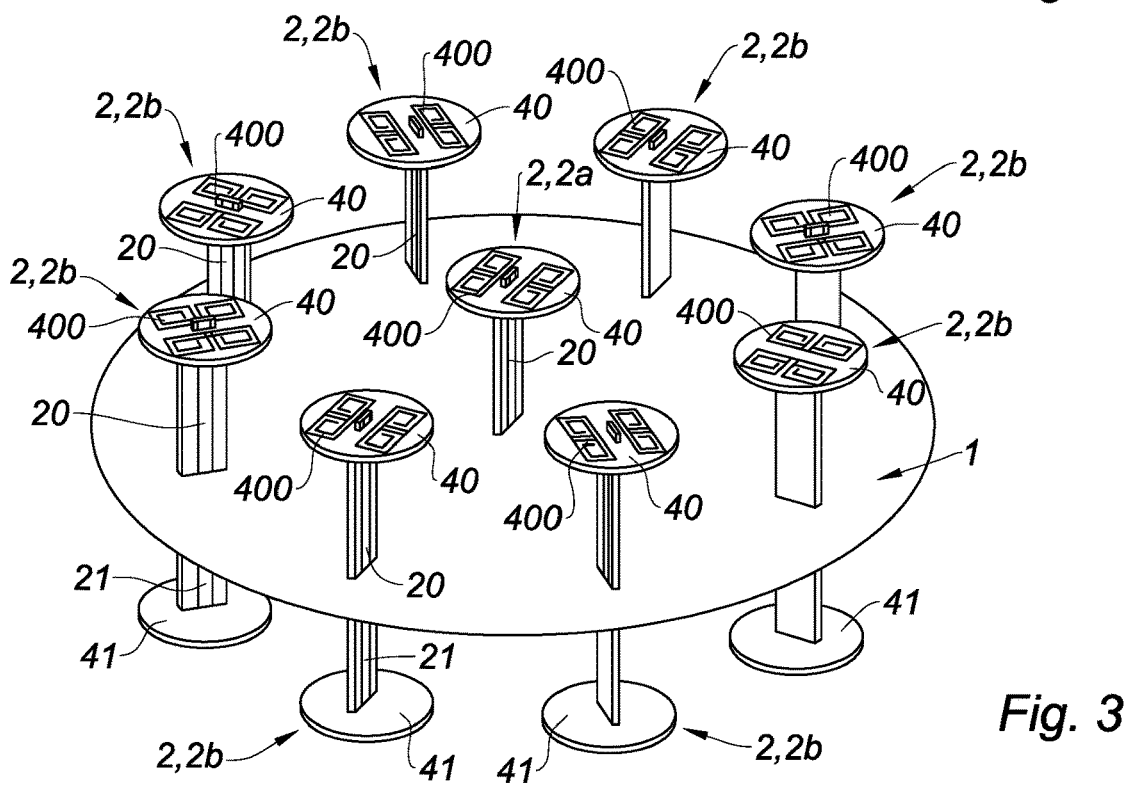
FIG. 3 is a schematic perspective view of a device according to the invention, illustrating an embodiment with a central dipole antenna and eight peripheral dipole antennas.
Figure 4:
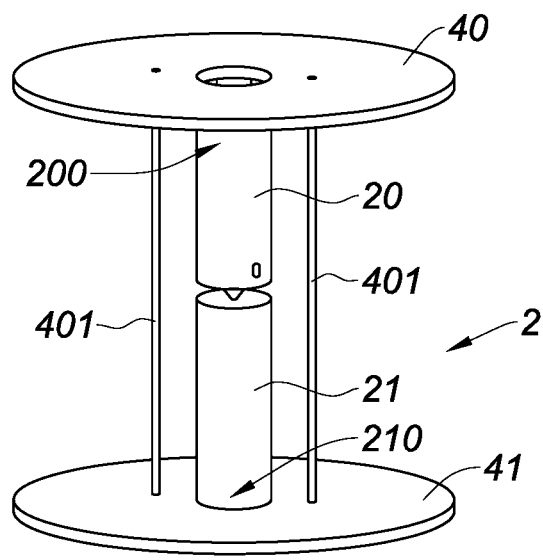
FIG. 4 is a schematic perspective view illustrating an embodiment of a dipole antenna fitted to a device according to the invention.
Figure 5:
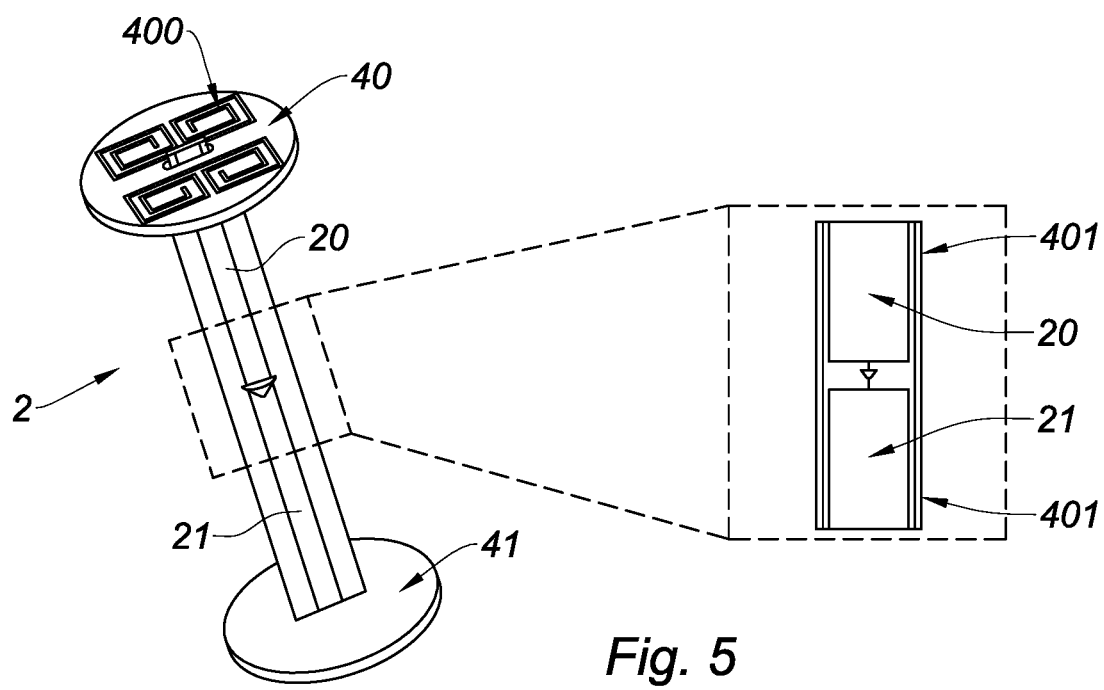
FIG. 5 is a schematic perspective view illustrating an embodiment of a printed dipole antenna fitted to a device according to the invention.

Advantageously, the first and second strands 20, 21 of the or each dipole antenna 2 respectively have first and second distal ends 200, 210 equipped respectively with first and second capacitive roofs 40, 41. Each capacitive roof 40, 41 extends in a direction perpendicular to the direction of the corresponding strand 20, 21. The first and second capacitive roofs 40, 41 are short-circuited, preferably by way of two short-circuit strands 401, for example produced in the form of wires. However, it is possible to use a larger number of short-circuit strands 401, as described in document U.S. Pat. No. 6,750,825 B1. The short-circuit strands 401 may be in contact with the ground plane 1. Each capacitive roof 40, 41 is preferably circular in shape, with a diameter of the order of $\lambda/6$. Other shapes may however be contemplated, such as a square, rectangular, elliptical or else a star shape. As illustrated in FIGS. 3 and 5, the first and second capacitive roofs 40, 41 are advantageously provided with slots 400. The slots 400 are preferably arranged in meandering form so as to reduce the dimension of the capacitive roofs 40, 41.

The first and second strands 20, 21 of the or each dipole antenna 2 are preferably made from a metal material. As illustrated in FIGS. 3 and 5, the first and second strands 20, 21 of the or each dipole antenna 2 may be printed on a printed circuit board, for example of the type Rogers RO30060. As illustrated in FIGS. 3 and 5, the short-circuit strands 401, arranged so as to short-circuit the first and second capacitive roofs 40, 41, may be printed on the printed circuit board. The short-circuit strands 401, which are electrically conductive, may be produced in the form of wires, strips or else tracks.

Configuration of a Network of Dipole Antennas

As illustrated in FIGS. 2 and 3, the antenna may have a set of dipole antennas 2 extending through the ground plane 1, each dipole antenna 2 of the set comprising first and second strands 20, 21 extending on either side of the ground plane 1.

According to one embodiment (not illustrated), the set of dipole antennas 2 has:

a first dipole antenna 2a;

a second dipole antenna 2b, having electromagnetic coupling to the first dipole antenna 2a.

The second dipole antenna 2b forms a stray antenna that makes it possible, by virtue of the electromagnetic coupling to the first dipole antenna 2a and of the introduction of matched load impedances within the control circuit 3, to achieve a reconfigurable antenna.

The set of dipole antennas 2 advantageously has:

a central dipole antenna 2a, arranged in the centre of the ground plane 1;

at least one pair of peripheral dipole antennas 2b, arranged around the central dipole antenna 2a with central symmetry.

It should be noted that the central symmetry makes it possible to simplify the design of the device, but is not essential to solving the technical problem.

The dipole antennas 2 of the set are advantageously spaced from one another by a small enough distance ($\leq 0.5\lambda$, where $\lambda$ is the operating wavelength of the device) to take advantage of the electromagnetic coupling between them, and to do so in order to form a super-directional beam. By way of example, this distance is $0.15\lambda$ in the proposed RFID application. The dipole antennas 2 of the set are advantageously spaced from one another by a distance less than or equal to $\lambda/5$, where $\lambda$ is the operating wavelength of the device, so as to achieve the formation of a super-directional beam.

By way of nonlimiting example illustrated in FIG. 2, the set of dipole antennas 2 may have a pair of peripheral dipole antennas 2b, arranged around the central dipole antenna 2a with central symmetry.

By way of nonlimiting example illustrated in FIG. 3, the set of dipole antennas 2 may have four pairs of peripheral dipole antennas 2b, arranged around the central dipole antenna 2a with central symmetry. The four pairs of peripheral dipole antennas 2b are preferably distributed uniformly around the central dipole antenna 2a, so as to achieve an aperture angle of 45° for the beam. In the case of an RFID spatial filtering application in the UHF band (around 868 MHz), the antenna according to the invention exhibits directional radiation with maximum directivity—in a direction called maximum direction—of 9.1 dBi (for decibels relative to isotropic) at 868 MHz in the azimuthal plane. The antenna beam is clamped in the maximum direction with an aperture angle at −3 dB of 52°. The antenna exhibits a gain greater than 6 dBi in said maximum direction.

It is possible to increase the number of pairs of peripheral dipole antennas 2b so as to reduce the aperture angle of the beam.

In the case illustrated in FIG. 1 of a single dipole antenna 2, the device according to the invention may be reconfigurable, that is to say that at least one feature of the antenna may be modified during its lifetime, after it is manufactured. The feature or features generally able to be modified are the frequency response (in terms of amplitude and in terms of phase), the radiation pattern, and the polarization. The control circuit 3 has matched load impedances in order to form a reconfigurable antenna. By way of example, it is possible to use a variable capacitor in order to achieve a modifiable frequency response.

Control Circuit

Figure 7:
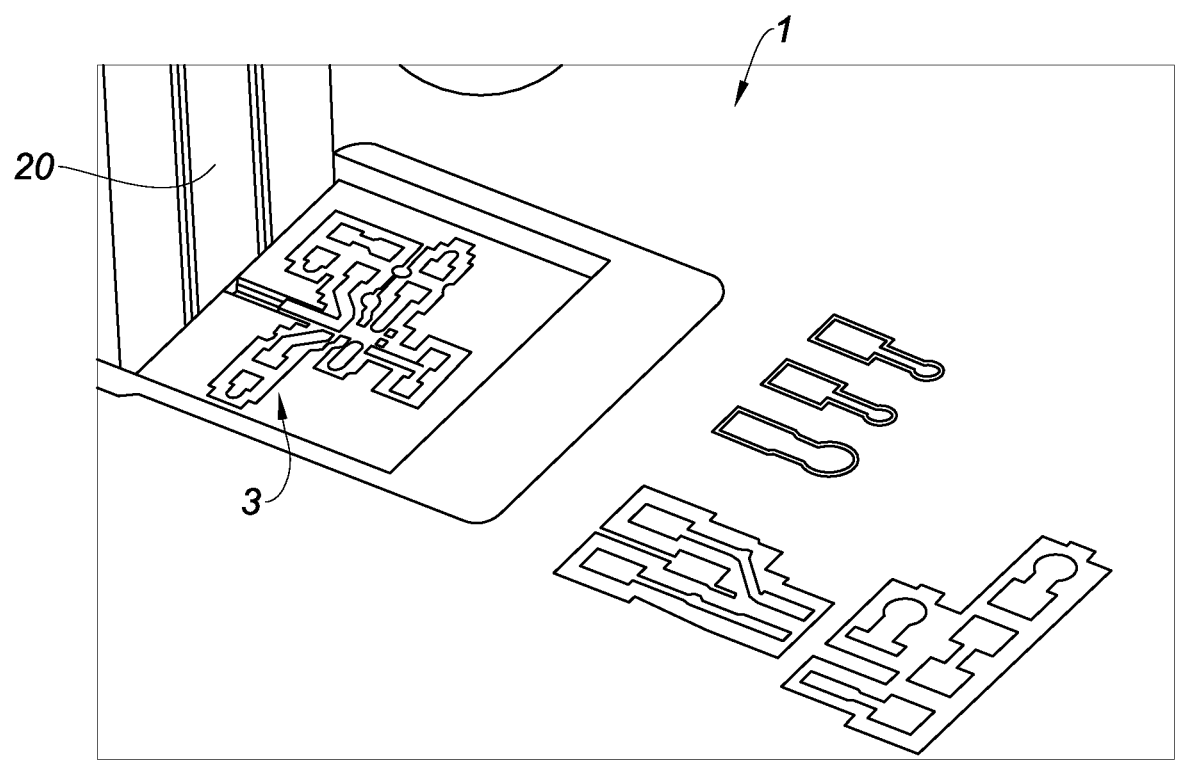
FIG. 7 is a schematic perspective view showing, on an enlarged scale, a control circuit for a dipole antenna fitted to a device according to the invention.

As illustrated in FIG. 7, the control circuit 3 is arranged on the ground plane 1 in order to control the or each dipole antenna 2.

The central dipole antenna 2a is preferably supplied with power in differential mode, and not in common mode, in the absence of a ground. To this end, by way of nonlimiting example, the control circuit 3 may have two cross-coupled bipolar transistors, as described in document US 2017/0163224. The collectors of each bipolar transistor are connected to the bases of the other transistor, so as to form a feedback loop. A load impedance is arranged in the loop formed by the two bipolar transistors so as to achieve a floating negative impedance between the emitters of the two bipolar transistors. The first and second strands 20, 21 of the central dipole antenna 2a are connected to the emitters of the two bipolar transistors.

Figure 6:
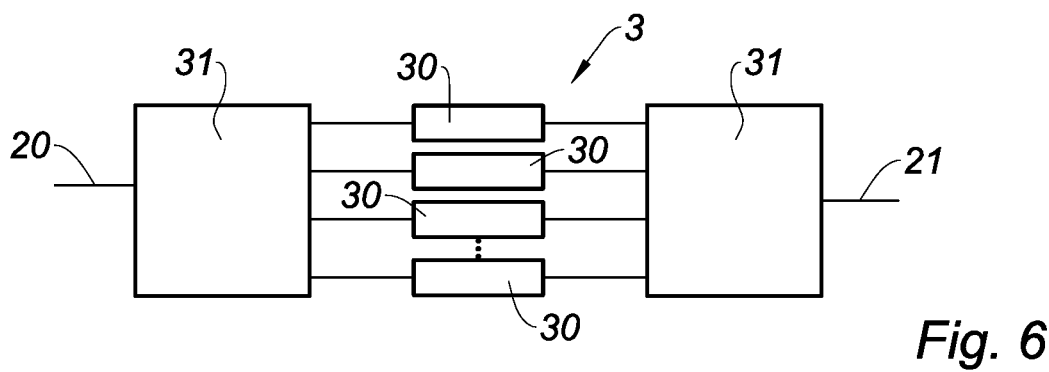
FIG. 6 is a schematic view illustrating a control circuit for a dipole antenna fitted to a device according to the invention.

As illustrated in FIG. 6, the control circuit 3 is configured so as to assign the optimum load impedances 30 to the first and second strands 20, 21 of each peripheral dipole antenna 2b (called stray antenna), and to do so in order to achieve the maximum directional beam in a desired direction. A person skilled in the art knows how to calculate the optimum load impedances; one procedure is described notably in document US 2015/0054688. The load impedances 30 may be driven for example using switches 31. The load impedances 30 may have real parts and/or imaginary parts. By way of nonlimiting example, the central dipole antenna 2a may be supplied with power by a symmetrizer circuit called a "balun" and/or may be connected to an impedance matching network.

Object Equipped with an Antenna

The invention also relates to an object having a device according to the invention. By way of nonlimiting example, the object may be selected from the group containing an object connected to the Internet, a radiofrequency identification reader, a radar, a sensor or an electromagnetic compatibility device.

The invention is not limited to the described embodiments. A person skilled in the art is capable of considering technically feasible combinations thereof and of substituting them with equivalents.

The invention claimed is:

1. An antenna device, comprising:
   at least one operating frequency;
   a ground plane at floating potential so that the ground plane is not subjected to an electrical reference potential at the at least one operating frequency;
   at least one dipole antenna, extending through the ground plane such that the at least one dipole antenna passes through the ground plane from one side to another, and comprising first and second strands extending on either side of the ground plane; and
   a control circuit, arranged on the ground plane in order to control the at least one dipole antenna.

2. The antenna device according to claim 1, wherein the first and second strands of the at least one dipole antenna extend along a direction normal to the ground plane.

3. The antenna device according to claim 1, wherein the first and second strands of the at least one dipole antenna extend on either side of the ground plane with planar symmetry.

4. The antenna device according to claim 1, wherein the first and second strands of the at least one dipole antenna respectively have first and second distal ends respectively provided with first and second capacitive roofs, the first and second capacitive roofs being short-circuited.

5. The antenna device according to claim 4, wherein the first and second capacitive roofs are provided with slots.

6. The antenna device according to claim 4, comprising short-circuit strands arranged so as to short-circuit the first and second capacitive roofs.

7. The antenna device according to claim 6, wherein the short-circuit strands are printed on a printed circuit board.

8. The antenna device according to claim 1, wherein the first and second strands of the at least one dipole antenna are printed on a printed circuit board.

9. The antenna device according to claim 1, comprising a set of dipole antennas extending through the ground plane, each dipole antenna of the set comprising first and second strands extending on either side of the ground plane.

10. The antenna device according to claim 9, wherein the set of dipole antennas comprises:
    a central dipole antenna, arranged in a centre of the ground plane; and
    at least one pair of peripheral dipole antennas, arranged around the central dipole antenna with central symmetry.

11. The antenna device according to claim 10, wherein the set of dipole antennas has four pairs of peripheral dipole antennas, arranged around the central dipole antenna with central symmetry.

12. The antenna device according to claim 10, wherein the dipole antennas of the set are spaced from one another by a distance less than or equal to $\lambda/2$ where $\lambda$ is an operating wavelength of the device.

13. The antenna device according to claim 12, wherein the dipole antennas of the set are spaced from one another by a distance less than or equal to $\lambda/5$.

14. The antenna device according to claim 1, comprising:
    a first dipole antenna; and
    a second dipole antenna, having electromagnetic coupling to the first dipole antenna.

15. The antenna device according to claim 1, comprising a single dipole antenna, and the control circuit has matched load impedances in order to form a reconfigurable antenna.

16. The antenna device according to claim 1, having a maximum characteristic dimension less than or equal to $\lambda/2$, where $\lambda$ is an operating wavelength of the device.

17. An object equipped with an antenna device according to claim 1.

18. The object according to claim 17, comprising one of an object connected to the Internet, a radiofrequency identification reader, a radar, a sensor and an electromagnetic compatibility device.

* * * * *